United States Patent
Yamada et al.

(10) Patent No.: US 11,136,244 B2
(45) Date of Patent: Oct. 5, 2021

(54) RARE EARTH COLD ACCUMULATING MATERIAL PARTICLES, AND REFRIGERATOR, SUPERCONDUCTING MAGNET, INSPECTION DEVICE AND CRYOPUMP USING SAME

(71) Applicants: KABUSHIKI KAISHA TOSHIBA, Tokyo (JP); TOSHIBA MATERIALS CO., LTD, Yokohama (JP)

(72) Inventors: Katsuhiko Yamada, Yokohama (JP); Keiichi Fuse, Yokohama (JP)

(73) Assignees: Kabushiki Kaisha Toshiba, Tokyo (JP); Toshiba Materials Co., Ltd., Yokohama (JP)

( * ) Notice: Subject to any disclaimer, the term of this patent is extended or adjusted under 35 U.S.C. 154(b) by 395 days.

(21) Appl. No.: 16/182,908

(22) Filed: Nov. 7, 2018

(65) Prior Publication Data

US 2019/0071317 A1    Mar. 7, 2019

Related U.S. Application Data

(63) Continuation of application No. 15/509,334, filed as application No. PCT/JP2015/075184 on Sep. 4, 2015, now Pat. No. 10,155,668.

(30) Foreign Application Priority Data

Sep. 25, 2014    (JP) ................... 2014-195603

(51) Int. Cl.
| | |
|---|---|
| *C01F 17/00* | (2020.01) |
| *C01F 17/294* | (2020.01) |
| *C09K 5/14* | (2006.01) |
| *F04B 37/08* | (2006.01) |
| *F25B 9/00* | (2006.01) |
| *C01F 17/34* | (2020.01) |
| *C01F 17/206* | (2020.01) |
| *F25B 29/00* | (2006.01) |
| *F25D 29/00* | (2006.01) |
| *H01F 6/00* | (2006.01) |

(52) U.S. Cl.
CPC .......... *C01F 17/294* (2020.01); *C01F 17/206* (2020.01); *C01F 17/34* (2020.01); *C09K 5/14* (2013.01); *F04B 37/08* (2013.01); *F25B 9/00* (2013.01); *F25B 29/00* (2013.01); *F25D 29/001* (2013.01); *H01F 6/003* (2013.01)

(58) Field of Classification Search
CPC .... C01F 17/0043; C01F 17/0093; C09K 5/14; H01F 6/003; F25D 29/001; F25B 29/00
See application file for complete search history.

(56) References Cited

U.S. PATENT DOCUMENTS

| | | |
|---|---|---|
| 5,981,415 A | 11/1999 | Waku et al. |
| 6,363,727 B1 | 4/2002 | Hashimoto et al. |
| 2002/0026799 A1 | 3/2002 | Okamura et al. |
| 2004/0013593 A1 | 1/2004 | Takagimi et al. |
| 2008/0104967 A1 | 5/2008 | Satoh |
| 2012/0177875 A1 | 7/2012 | Beall et al. |
| 2015/0219366 A1 | 8/2015 | Yamada et al. |

FOREIGN PATENT DOCUMENTS

| | | |
|---|---|---|
| CN | 1334308 A | 2/2002 |
| JP | 2002-249763 A1 | 9/2002 |
| JP | 2003-137652 A1 | 5/2003 |
| JP | 2004-075884 A1 | 3/2004 |
| JP | 2004-123884 A1 | 4/2004 |
| JP | 3642486 B2 | 4/2005 |
| JP | 2006-242484 A1 | 9/2006 |
| JP | 2006-327927 A1 | 12/2006 |
| JP | 2010-077447 A1 | 4/2010 |
| JP | 4582994 B2 | 11/2010 |

OTHER PUBLICATIONS

*Rare Earth Metal Materials*, Beijing: Metallurgical Industry Press, Chief Editors: Tan Dingxiang et al., Aug. 1, 2011, 1st Edition, 1st Printing, pp. 260-263.
Chinese Office Action (Application No. 201580049386.8) dated Feb. 27, 2019 (with English translation).
International Search Report and Written Opinion (Application No. PCT/JP2015/075184) dated Nov. 10, 2015.
English Translation of International Preliminary Report on Patentability (International Application No. PCT/JP2015/075184) dated Mar. 28, 2017.
Extended European Search Report (Application No. 15843254.2) dated Apr. 16, 2018.

*Primary Examiner* — Steven J Bos
(74) *Attorney, Agent, or Firm* — Burr & Brown, PLLC

(57) ABSTRACT

The present invention provides a rare earth cold accumulating material particle comprising a rare earth oxide or a rare earth oxysulfide, wherein the rare earth cold accumulating material particle is composed of a sintered body; an average crystal grain size of the sintered body is 0.5 to 5 μm; a porosity of the sintered body is 10 to 50 vol. %; and an average pore size of the sintered body is 0.3 to 3 μm. Further, it is preferable that the porosity of the rare earth cold accumulating material particle is 20 to 45 vol. %, and a maximum pore size of the rare earth cold accumulating material particle is 4 μm or less. Due to this structure, there can be provided a rare earth cold accumulating material having a high refrigerating capacity and a high strength.

20 Claims, 4 Drawing Sheets

RARE EARTH COLD ACCUMULATING MATERIAL PARTICLES, AND REFRIGERATOR, SUPERCONDUCTING MAGNET, INSPECTION DEVICE AND CRYOPUMP USING SAME

CROSS REFERENCE TO RELATED APPLICATIONS

This application is a continuation of U.S. application Ser. No. 15/509,334, filed Mar. 7, 2017, which in turn is the national stage entry of International Application No. PCT/JP2015/075184, filed Sep. 4, 2015, which designated the United States, the entireties of which are incorporated herein by reference.

FIELD OF THE INVENTION

The present embodiment relates to rare earth cold accumulating material particles, and a refrigerator, a superconducting magnet, an inspection device and a cryopump using the same.

BACKGROUND OF THE INVENTION

Recently, the development of the superconducting technology has been remarkable, and with the expansion of the application fields of the superconducting technology, the development of small-size and high-performance refrigerators has been essential. Examples of the type of the refrigerator include various types such as a GM (Gifford-McMahon) type, a pulse type and a Stirling type. Examples of the products using these refrigerators include a superconducting magnet, MRI, NMR, a cryopump, a superconducting magnetic energy storage (SMES) and a single crystal pulling-up apparatus in a magnetic field for producing silicon wafers and the like.

In such a refrigerator, a working medium such as compressed He gas flows in one direction in a cold accumulator filled with a cold accumulating material, the thermal energy of the working medium is supplied to the cold accumulating material, and the expanded working medium flows in the opposite direction and receives the thermal energy from the cold accumulating material. As the recuperative effect in such a process becomes satisfactory, the thermal efficiency in the working medium cycle is improved, and it is made possible to actualize lower temperatures.

As such a cold accumulating material as described above filled in the cold accumulator of a refrigerator, Cu, Pb and the like have hitherto been mainly used. However, such a cold accumulating material has a remarkably small specific heat at ultralow temperatures of 20K or lower, accordingly does not allow the above-described recuperative effect to sufficiently function, cannot store a sufficient thermal energy in the cold accumulating material every one cycle at an ultralow temperature during the action in a refrigerator, does not allow the working medium to receive a sufficient thermal energy from the cold accumulating material.

Consequently, a refrigerator incorporating the cold accumulator filled with the cold accumulating material suffers from a problem that such a refrigerator is not allowed to reach an ultralow temperature. Thus, nowadays, in order to improve the recuperation property at ultralow temperatures of the cold accumulator and to actualize a refrigeration temperature closer to the absolute zero temperature, in particular, there are used rare earth cold accumulating materials mainly composed of intermetallic compounds including rare earth elements and transition metal elements such as $Er_3Ni$, $ErNi$ and $HoCu_2$ each having a local maximum value of the volume specific heat in the ultralow temperature region of 20K or lower wherein the local maximum value is large. By using such a rare earth cold accumulating material in a GM refrigerator, the refrigeration at 4K is actualized.

Along with the developed investigation of the application of such a refrigerator to various systems, from the technical requirements for stably cooling larger-scale cooling objects, refrigerators are required to be further improved in refrigerating capacity. In order to meet the requirements, recently, an attempt has been made to improve the refrigerating capacity by replacing part of a conventional metal-based magnetic cold accumulating material with a rare earth element-containing rare earth oxysulfide such as $Gd_2O_2S$.

A rare earth oxysulfide has a peak of the specific heat at 5K or lower, which is lower than the peak temperature of the specific heat of a rare earth cold accumulating material. Accordingly, an improvement of the refrigerating capacity can be achieved by using a rare earth oxysulfide as laminated on a rare earth cold accumulating material mainly composed of an intermetallic compound, having a large volume specific heat in the temperature region of 6K or higher. A rare earth oxide cold accumulating material such as $GdAlO_3$ has a low specific heat peak, and provides an effect similar to the effect obtained from a rare earth oxysulfide cold accumulating material.

Rare earth oxysulfide cold accumulating materials are disclosed in Japanese Patent No. 3642486 (Patent Document 1) and Japanese Patent No. 4582994 (Patent Document 2). In Patent Document 1 and Patent Document 2, high density sintered bodies each having a relative density of 98% or more are obtained by using a tumbling granulation method.

PRIOR ART DOCUMENTS

Patent Documents

Patent Document 1: Japanese Patent No. 3642486
Patent Document 2: Japanese Patent No. 4582994

SUMMARY OF THE INVENTION

Problems to be Solved by the Invention

In general, cold accumulating materials are used as processed into spherical particles of approximately 0.2 mm (200 μm) in particle size, in order to efficiently perform heat exchange with a working medium such as He gas, or in order to enhance the charging efficiency (filling efficiency) of the cold accumulating material into the cold accumulator of the refrigerator. The processing into spherical shapes allows the strength of the cold accumulating material to be increased.

The heat exchange with a working medium such as He gas is carried out at the portions where the working medium and the cold accumulating material are brought into contact with each other. A rare earth cold accumulating material composed of a high density sintered body does not sufficiently make the most of the advantage of the contact of the working medium only to the surface portion of a cold accumulating material and the advantage of the low specific heat peak of the material of the rare earth cold accumulating material.

In order to cope with such problems, Japanese Patent Laid-Open No. 2004-75884 (Patent Document 3) discloses a rare earth oxysulfide cold accumulating material particle composed of a porous material having a relative density of 60 to 85%. In other words, in Patent Document 3, by specifying the relative density so as to fall within a predetermined range, a rare earth oxysulfide cold accumulating material particle having pores is actualized. By having such constitution as described above, the compatibility between the air permeability and the strength is achieved. However, the pore sizes in the interior of the rare earth oxysulfide cold accumulating material particles are not controlled, and hence the upgrading of the improvement effect of the air permeability is limited.

Means for Solving the Problems

The rare earth cold accumulating material particles according to the embodiment are designed to solve the above-described problems, are composed of a rare earth oxide or a rare earth oxysulfide, wherein the rare earth cold accumulating material particles are composed of a sintered body, the average crystal grain size of the sintered body is 0.5 to 5 μm, the porosity of the sintered body is 10 to 50 vol. %, and the average pore size is 0.3 to 3 μm.

Advantages of the Invention

According to the rare earth cold accumulating material according to the embodiment, in the rare earth cold accumulating material including a rare earth oxide or a rare earth oxysulfide, the rare earth cold accumulating material is composed of a sintered body; the average crystal grain size, the porosity and the average pore size of the sintered body are controlled; accordingly, the working medium (He gas) is brought into contact with the interior of the pores; consequently, the interior of the sintered body can also be used as a heat exchange member. Thus, the refrigerating capacity can be drastically improved.

DETAILED DESCRIPTION OF THE INVENTION

The rare earth cold accumulating material particle of an embodiment is a rare earth cold accumulating material particle including a rare earth oxide or a rare earth oxysulfide, wherein the rare earth cold accumulating material particle is composed of a sintered body; the average crystal grain size of the sintered body is 0.5 to 5 μm; the porosity of the sintered body is 10 to 50 vol. %; and the average pore size of the sintered body is 0.3 to 3 μm.

Figure 1:
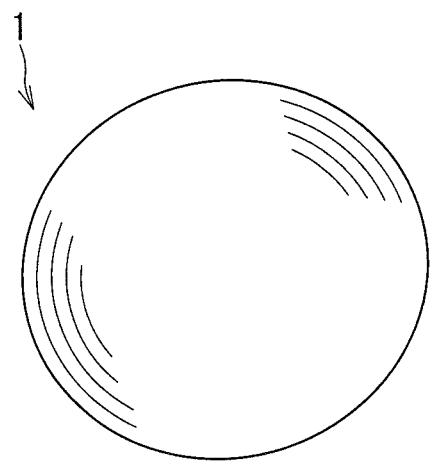
FIG. 1 is an oblique perspective view illustrating an example of the rare earth cold accumulating material particle according to an embodiment.

FIG. 1 shows an example of the rare earth cold accumulating material particle. In FIG. 1, the reference numeral 1 denotes the rare earth cold accumulating material particle. The rare earth cold accumulating material particle has a spherical shape having an aspect ratio of preferably 2 or less and more preferably 1.5 or less.

Figure 2:
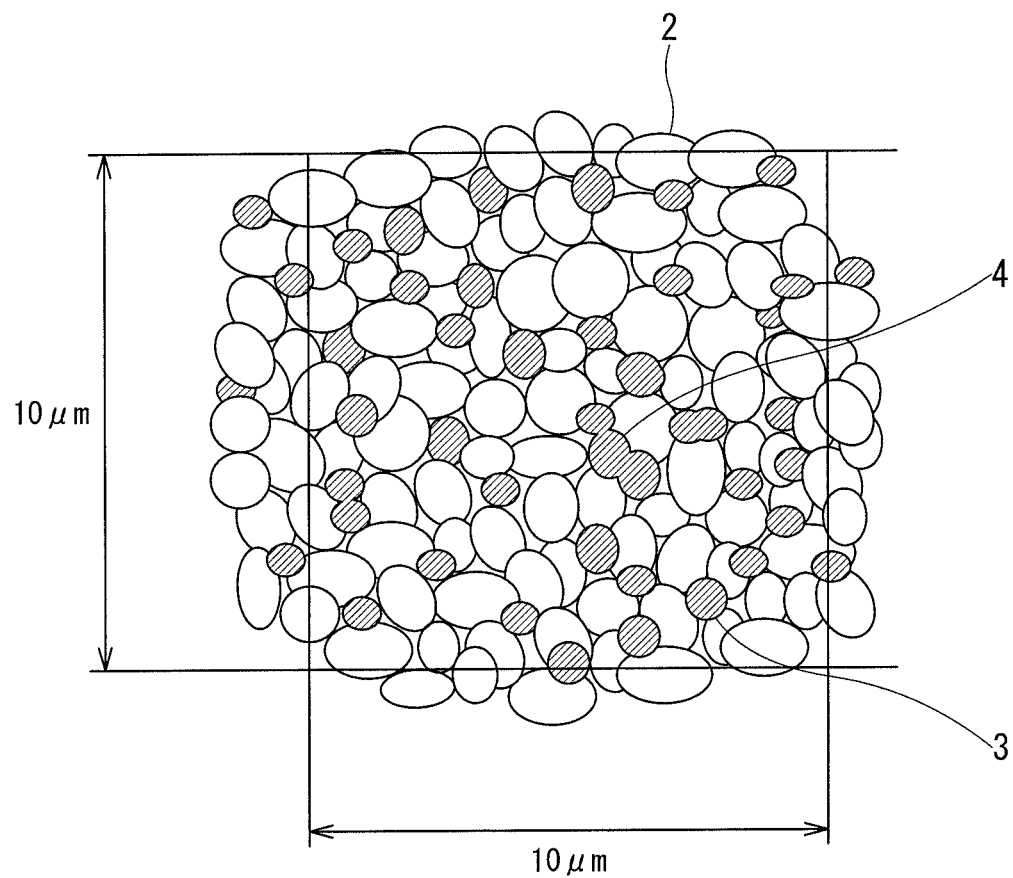
FIG. 2 is a plan view illustrating an example of an arbitrary cross sectional structure of the rare earth cold accumulating material particle according to the embodiment.
Figure 4:
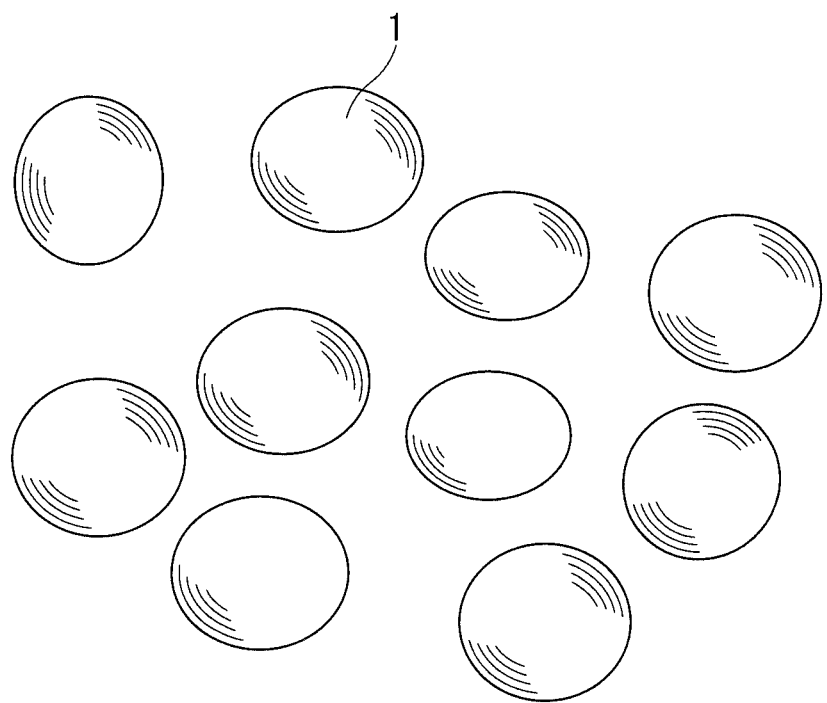
FIG. 4 is an oblique perspective view illustrating a group of the rare earth cold accumulating material particles according to an embodiment.

FIG. 2 also shows an example of an arbitrary cross section of the rare earth cold accumulating material particle. In FIG. 2, the reference numeral 2 denotes a rare earth compound crystal grain, the reference numeral 3 denotes a pore and the reference numeral 4 denotes a structure of connected pores. The rare earth compound crystal grain is a rare earth oxide or a rare earth oxysulfide. FIG. 4 is an oblique perspective view illustrating a group of the rare earth cold accumulating material particles 1.

Examples of the rare earth oxide may include composite oxides such as rare earth aluminum oxides. The rare earth oxide is preferably a gadolinium aluminum oxide, in particular, $GdAlO_3$. The rare earth oxysulfide is preferably a gadolinium oxysulfide, in particular, $Gd_2O_2S$. If necessary, a sintering aid may also be added to the rare earth oxide or the rare earth oxysulfide.

The rare earth cold accumulating material particle including the rare earth oxide or the rare earth oxysulfide is constituted with a sintered body. Here, the sintered body means a body obtained by molding a starting material powder, and by heating and sintering the resulting molded body. The starting material powder is a main starting material powder composed of a rare earth oxide or a rare earth oxysulfide and including, if necessary, a sintering aid powder as mixed in the main starting material powder. It is difficult to prepare a rare earth cold accumulating material particle composed of a rare earth oxide or a rare earth oxysulfide by melting the starting material although the rare earth cold accumulating material particle mainly composed of an intermetallic compound such as $HoCu_2$ can be prepared by melting the starting material. Accordingly, it is effective to prepare a sintered body by heating.

In the sintered body constituting the particle, the average crystal grain size is 0.5 to 5 μm. When the average crystal grain size is less than 0.5 μm, the crystal grains are too small, and accordingly it is difficult to control the porosity. On the other hand, when the average crystal grain size exceeds 5 μm to be too large, the strength of the rare earth cold accumulating material is degraded.

The measurement method of the average crystal grain size is as follows. Specifically, in an arbitrary cross section of the rare earth cold accumulating material particle, an enlarged photograph of a unit area of 10 μm×10 μm is taken. The enlarged photograph is a SEM photograph of 2000 or more in magnification. In each of the crystal grains of the rare earth oxide or the rare earth oxysulfide, shown in the enlarged photograph, the longest diagonal is measured as a major axis. The average value of the major axes of 100 of the crystal grains is taken as the average crystal grain size.

The porosity of the rare earth cold accumulating material particle is specified to fall within a range from 10 to 50 vol. %. When the porosity is less than 10 vol. %, the effect of the provision of the pores is not sufficient. On the other hand, when the porosity exceeds 50 vol. % to be too large, the strength of the cold accumulating material particle is degraded. The porosity set to fall within a range from 10 to 50 vol. % allows the interior of the rare earth cold accumulating material particle composed of a sintered body to be brought into contact with the working medium (He gas), and thus, the cold accumulating effect is improved. The porosity is preferably set to 20 to 45 vol. %.

The average pore size (average pore diameter) is preferably set to 0.3 to 3 μm. When the average pore size is too small as less than 0.3 μm, it is difficult for the cooling medium gas (He gas) to enter the interior of the rare earth cold accumulating material particle. On the other hand, when the average pore size exceeds 3 μm to be too large, the strength of the cold accumulating material particle is degraded.

The maximum pore size (maximum pore diameter) is preferably 4 μm or less. When the maximum pore size exceeds 4 μm to be too large, the strength of the cold accumulating material particle is liable to be degraded. Accordingly, the maximum pore size is preferably 4 μm or less and further preferably 2 μm or less. The minimum value of the maximum pore size is not particularly limited, but is preferably 0.5 μm or more. In other words, the maximum pore size preferably falls within a range from 0.5 to 4 μm.

In an arbitrary cross section of the rare earth cold accumulating material particle, the number of the pores per the unit area of 10 μm×10 μm is preferably 20 to 70. When the number of the pores per the unit area is too small as less than 20, the cold accumulating effect is small. On the other hand, when the number of the pores per the unit area is too large as exceeding 70, the strength of the cold accumulating material particle is liable to be degraded. In particular, the number of the pores having the pore sizes equal to or less than the maximum pore size of 4 μm is preferably limited to 20 to 70 per the unit area of 10 μm×10 μm, and further preferably falls within a range from 30 to 60.

In an arbitrary cross section of the rare earth cold accumulating material particle, part of the pores present in the unit area of 10 μm×10 μM preferably have structures of connected pores. FIG. 2 shows a structure 4 of connected pores as an example. In an arbitrary cross section, the micro region of the unit area of 10 μm×10 μm has structures of connected pores, and hence the air permeability of the interior of the rare earth cold accumulating material particle can be improved.

Figure 3A:
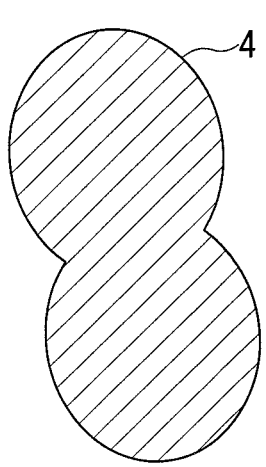
FIG. 3A and FIG. 3B are plan views each illustrating an example of the structure of connected pores.
Figure 3B:
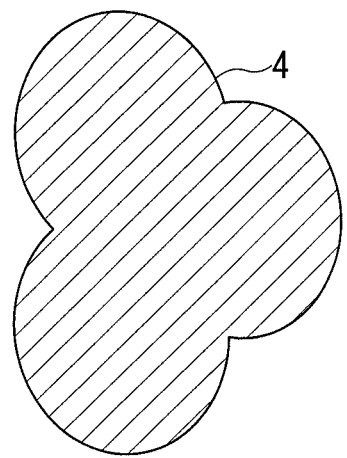

FIG. 3 shows examples of the structure of connected pores. FIG. 3A shows a structure of two connected pores, whereas FIG. 3B shows an example of a structure of three connected pores. The rare earth cold accumulating material particle according to an embodiment is not limited to such a structure, and may have a structure of four or more connected pores. As shown in FIG. 3, the structure of connected pores gives a shape formed by connected circles (inclusive of ellipses).

The measurement methods of the average pore size, the maximum pore size, the number of the pores, and the structure of the connected pores are as follows. First, in an arbitrary cross section of the rare earth cold accumulating material particle, an enlarged photograph of the unit area of 10 μm×10 μm is taken. The enlarged photograph is a SEM photograph of 2000 or more in magnification.

For easy observation of the pores, secondary electron images are used. In the secondary electron images of the SEM photographs, the pores are shown in black. The longest diagonal of the pore observed in the secondary electron image is taken as the maximum diameter of the pore. The average value of the maximum diameters of the pores shown in the unit area of 10 μm×10 μm is obtained. The number of the pores shown in the unit area of 10 μm×10 μm is counted. Here, in the portions having the structures of connected pores, each structure of connected pores is counted as one pore. This operation is performed in five of the unit areas (one unit area: 10 μm×10 μm). In these five unit areas, the longest diagonal is taken as the maximum pore size. The average pore size and the average number of the pores are determined as the average values over the five unit areas, respectively.

By controlling, as described above, the average crystal grain size, the volume proportion of the pores, the average pore size, and the maximum pore size, the cold accumulating effect can be sufficiently improved while the mechanical strength of the rare earth cold accumulating material particle composed of a sintered body is being maintained. In particular, the number and the sizes of the pores are controlled in the micro region (unit area: 10 μm×10 μm) in the interior of the rare earth cold accumulating material particle, and hence the cold accumulating property can be improved.

The rare earth cold accumulating material particles preferably have an average particle size of 100 to 500 μm. The average particle size set to fall within a range from 100 to 500 μm allows the filling factor of the cold accumulating material particles in the cooling stage of a refrigerator to be improved so as to fall within a range from 55 to 70%. In order to improve the filling factor, the average particle size of the particles is preferably specified to be 150 to 300 μm.

When L represents the perimeter length of the projection image of each of the cold accumulating material particles constituting a group of rare earth cold accumulating material particles, and A represents the actual area of the projection image, it is preferable that in the group of rare earth cold accumulating material particles, the proportion of the rare earth cold accumulating material particles having the shape factor R being represented by $L^2/4\pi A$ and exceeding 1.5 be preferably 5% or less. In other words, by allowing each of the rare earth cold accumulating material particles to have a shape substantially close to a sphere, the filling factor can be improved, and a path (passage) of the working medium gas (He gas) can be formed in the mutual gaps between the rare earth cold accumulating material particles.

The rare earth cold accumulating material particles according to an embodiment are effective for a refrigerator. In particular, the above-described particles are effective for a refrigerator for obtaining an ultralow temperature region of 10K or lower. The rare earth cold accumulating material particles are filled in a cold accumulating vessel of the refrigerator. When the rare earth cold accumulating material particles are filled in the cold accumulating vessel, a group of the rare earth cold accumulating material particles including a large number of the rare earth cold accumulating material particles according to an embodiment is prepared. The group of the rare earth cold accumulating material particles preferably includes the rare earth cold accumulating material particles according to an embodiment in a content of 50% by mass or more and 100% by mass or less.

Figure 5:
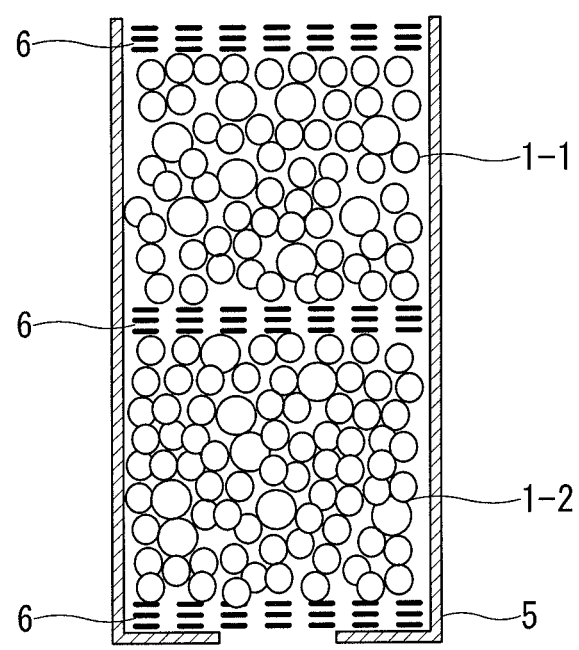
FIG. 5 is a cross sectional view illustrating an example of the second cooling stage of the refrigerator according to an embodiment.
Figure 6:
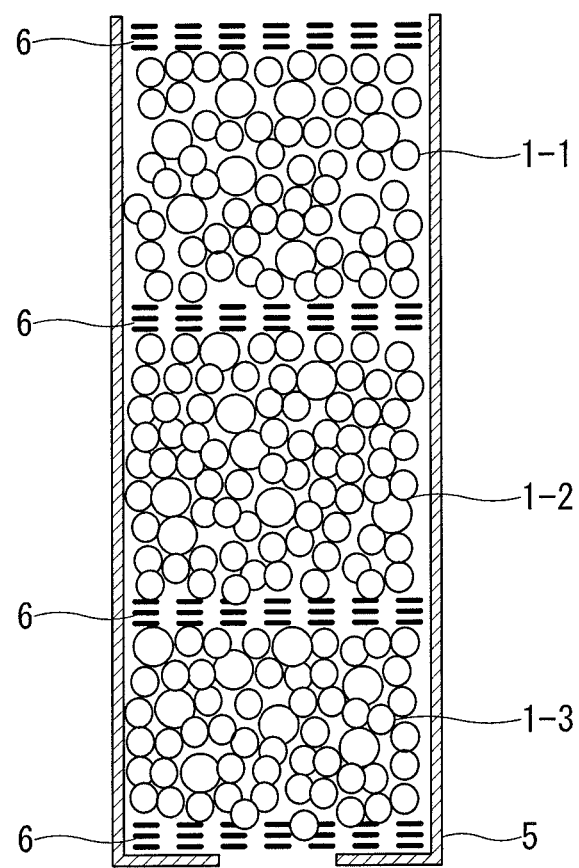
FIG. 6 is a cross sectional view illustrating another example of the second cooling stage of the refrigerator according to the embodiment.

FIG. 5 and FIG. 6 each show an example of the use of the group of the rare earth cold accumulating material particles as filled in the cold accumulating vessel of a refrigerator. In FIG. 5 and FIG. 6, the reference numeral 1-1 denotes a first group of cold accumulating material particles, the reference numeral 1-2 denotes a second group of cold accumulating material particles, the reference numeral 1-3 denotes a third group of cold accumulating material particles, the reference numeral 5 denotes a cold accumulating vessel, and the reference numeral 6 denotes a metal mesh.

As the refrigerator, there are various types such as a GM-type refrigerator, a Sterling-type refrigerator and a pulse-type refrigerator. In the case of any one of these, an ultralow temperature of 10K or lower, and furthermore an ultralow temperature of 4K or lower can be achieved. In order to obtain an ultralow temperature, it is necessary to fill a cold accumulating material in each of the cold accumulating vessels referred to as a first cooling stage and a second cooling state, respectively. If necessary, a third cooling stage may also be installed.

In FIG. 5, the interior of the second cooling stage of the refrigerating vessel (cold accumulating vessel) is divided into two filling layers. In FIG. 6, the interior of the second cooling stage is divided into three filling layers. In each of the regions, a group of cold accumulating material particles is filled. Metal meshes are disposed above and below each group of cold accumulating material particles, and the metal meshes hold the respective groups of cold accumulating material particles while maintaining air permeability. The groups of cold accumulating material particles are used so as for the specific heat peak of the cold accumulating material particles to become lower on going from the first cooling stage, through the second cooling stage, to the third cooling stage.

As the metal mesh 6, a copper (Cu) mesh is preferable. The specific heat of copper is low, and hence the copper mesh has an effect as a cold accumulating material. Copper meshes may be used as a plurality of copper meshes superposed on each other. The mesh size is set at a size not allowing the group of cold accumulating material particles to pass therethrough.

FIG. 5 shows a two-layer type in which the interior of the second cooling stage is provided with a plurality of filling layers through the intermediary of metal meshes, wherein the filling layer filling the first group of cold accumulating material particles 1-1 and the filling layer filling the second group of cold accumulating material particles 1-2 are provided.

FIG. 6 shows a three-layer type in which the filling layer filled with the first group of cold accumulating material particles 1-1, the filling layer filled with the second group of cold accumulating material particles 1-2 and the filling layer filled with the third group of cold accumulating material particles 1-3 are provided. As a matter of course, a one-layer type or a four-layer type may also be adopted.

When the second cooling stage is divided into a plurality of filling layers, at least in one filling layer, a group of rare earth cold accumulating material particles according to an embodiment is used. For example, in the case of the two-layer type, a combination is quoted in which a group of $HoCu_2$ particles is used for the first group of cold accumulating material particles, and a group of rare earth cold accumulating material particles (for example, a group of $Gd_2O_2S$ particles) according to an embodiment is used for the second group of cold accumulating material particles.

For example, in the case of the three-layer type, a combination is quoted in which a group of lead cold accumulating material particles is used as the first group of cold accumulating material particles, a group of $HoCu_2$ particles is used as the second group of cold accumulating material particles, and a group of rare earth cold accumulating material particles (for example, a group of $Gd_2O_2S$ particles) according to an embodiment is used as the third group of cold accumulating material particles.

In the combinations of the cold accumulating materials, the cold accumulating material having a higher specific heat peak temperature is adopted as the first group of cold accumulating material particles, and the cold accumulating material having a lower specific heat peak temperature is adopted as the second group of cold accumulating material particles, and the groups of cold accumulating material particles are combined in the decreasing order of the specific heat peak temperature.

When the interior of the cold accumulating vessel is partitioned with metal meshes, it is preferable that groups of cold accumulating material particles be filled in the filling layers, respectively and pressed with the metal meshes, and thus be filled so as for the gaps between the metal meshes and the groups of cold accumulating material particles to be made as small as possible. The gaps between the metal meshes and the groups of cold accumulating material particles have spaces, the vibration during the operation of the refrigerator or the pressure of the helium gas displaces the cold accumulating materials within the filling layers, and the cold accumulating materials are liable to be destructed.

Next, the method for producing the rare earth cold accumulating material particles according to an embodiment is described. The method for producing the rare earth cold accumulating material particles according to an embodiment is not particularly limited as long as the rare earth cold accumulating material particles according to the embodiment have the above-described constitution. However, as the method for efficiently obtaining the rare earth cold accumulating material particles according to an embodiment, the following method is adopted.

First, a rare earth compound powder to be a starting material for the rare earth cold accumulating material particles is prepared. For example, when a $GdAlO_3$ cold accumulating material is produced, a $GdAlO_3$ powder is prepared. Alternatively, when a $Gd_2O_2S$ cold accumulating material particle is produced, a $Gd_2O_2S$ powder is prepared.

The rare earth compound powder to be used as the starting material preferably has an average particle size of 0.3 to 5 µm. When the average particular size is less than 0.3 µm, or exceeds 5 µm, it is difficult to control the average crystal grain size of the sintered body so as to be 0.5 to 5 µm. If necessary, a sintering aid powder may also be added. The content (addition amount) of the sintering aid powder is set to be 1 part by mass or more and 20 parts by mass or less in relation to 100 parts by mass of the rare earth compound powder.

When the average particle size of the sintering aid powder is represented by A (µm), and the average particle size of the rare earth compound powder is represented by B (µm), B/A is preferably regulated so as to fall within a range from 0.7 to 1.3. When the difference between the average particle size of the rare earth compound powder and the average particle size of the sintering aid powder is excessively large, the control of the average pore size in the sintered body is difficult.

Next, the molding step is performed. In the molding step, preferable is a method using such a tumbling granulation step as described in the paragraph [0055] of Patent Document 2. When the tumbling granulation step is performed, a resin binder is added. The addition amount of the resin binder is such that the resin binder is added so as for the addition amount of the resin binder to be 10 to 50 vol. % in relation to 100 vol. % of the total amount of the rare earth compound powder and the resin binder.

When the sintering aid powder is added, the sintering aid powder is added so as for the addition amount of the resin binder to be 10 to 50 vol. % in relation to 100 vol. % of the total amount of the rare earth compound powder, the sintering aid powder and the resin binder.

The resin binder is dissipated in the sintering step. By setting the addition amount of the resin binder to be 10 to 50 vol. %, the resin binder dissipated in the sintering step gives rise to pores. The rare earth compound powder and the resin binder are mixed with each other in a predetermined volume ratio, and then the resulting mixture is sufficiently stirred.

After a starting material paste is prepared in which the rare earth compound powder and the resin binder are uniformly mixed with each other, the molding step is performed.

For the molding step, the methods such as tumbling granulation and die molding are quoted. These methods may also be combined. From the molding step, a spherical molded body is obtained. The average particle size of the spherical molded body preferably falls within a range from 100 to 500 μm.

Next, the sintering step is performed. The sintering step preferably performs a heat treatment at a temperature of 1200° C. or higher and 2000° C. or lower. The sintering step dissipates the resin binder. The sintering step can bind the rare earth compound powder particles to each other. In order to increase the mutual binding force of the rare earth compound powder particles, the sintering temperature is preferably set to be 1500° C. or higher, and the sintering time is preferably 1 hour or more and 48 hours or less. The atmosphere for the sintering step may be a pressurized atmosphere.

When the sintering temperature exceeds 2000° C., or the heat treatment is performed for a time as long as 48 hours or more, the crystal grains of the rare earth compound (a rare earth oxide or a rare earth oxysulfide) undergo excessive grain growth, and the targeted average crystal grain size is liable not to be attained.

The sintering step yields a spherical sintered body. For the spherical sintered body, if necessary, a surface polishing process is performed.

In the case of the rare earth cold accumulating material particles composed of a rare earth oxide sintered body, the heat treatment is preferably performed in an oxygen atmosphere. In the case of the rare earth cold accumulating material particles composed of a rare earth oxysulfide sintered body, the heat treatment is preferably performed in a sulfur atmosphere including a sulfur oxide such as $SO_2$.

By the sintering step or the surface polishing process, the recovery of the portions lacking oxygen or sulfur can be performed. Consequently, as disclosed in Patent Document 2, when irradiation with a light beam having a wavelength of 400 nm to 600 nm is applied, the reflectance of the surface portion of the cold accumulating material particles can be made to be 30% or more and 95% or less. In Patent Document 2, the heat treatment temperature is described to be preferably 900 to 1200° C.

In the present embodiment, the surface polishing process and the heat treatment step may be performed in combination. If necessary, the spherical sintered body is to be subjected to a shape classification. The shape classification selects and adopts the spherical sintered body having an aspect ratio of preferably 2 or less and more preferably 1.5 or less.

As the shape classification, when L represents the perimeter length of the projection image of each of the cold accumulating material particles constituting a group of rare earth cold accumulating material particles, and A represents the actual area of the projection image, it is effective that in the group of rare earth cold accumulating material particles, the proportion of the rare earth cold accumulating material particles having the shape factor R being represented by $L^2/4\pi A$ and exceeding 1.5 is made to be 5% or less.

On the basis of the above-described production method, the rare earth cold accumulating material particles according to an embodiment can be efficiently obtained.

EXAMPLES

Examples 1 to 6 and Comparative Examples 1 to 4

As a rare earth oxide, a gadolinium aluminum oxide ($GdAlO_3$) powder having an average particle size of 2 μm was prepared. In addition, as a rare earth oxysulfide, a gadolinium oxysulfide ($Gd_2O_2S$) powder having an average particle size of 2 μm was prepared. Each of these powders was mixed with a resin binder under the condition shown in Table 1.

The addition amount of the resin binder is given in a proportion in relation to 100 vol. % of the total amount of the rare earth compound powder and the resin binder.

TABLE 1

| Sample No. | Rare Earth Compound Powder | Addition Amount of Resin Binder (vol %) |
| --- | --- | --- |
| Example 1 | $GdAlO_3$ | 23 |
| Example 2 | $GdAlO_3$ | 31 |
| Example 3 | $GdAlO_3$ | 43 |
| Comparative Example 1 | $GdAlO_3$ | 5 |
| Comparative Example 2 | $GdAlO_3$ | 70 |
| Example 4 | $Gd_2O_2S$ | 22 |
| Example 5 | $Gd_2O_2S$ | 32 |
| Example 6 | $Gd_2O_2S$ | 42 |
| Comparative Example 3 | $Gd_2O_2S$ | 5 |
| Comparative Example 4 | $Gd_2O_2S$ | 60 |

A starting material paste was prepared by mixing the rare earth compound powder and the resin binder, and then the molding step was performed by the tumbling granulation method. For the obtained spherical molded body, the sintering step was performed at 1850° C. for 2 hours. Subsequently, spherical sintered bodies having an aspect ratio of 1.5 or less were collected by shape classification.

Further, a shape classification was performed in such a way that when L represented the perimeter length of the projection image of each of the cold accumulating material particles constituting a group of rare earth cold accumulating material particles, and A represented the actual area of the projection image, in the group of rare earth cold accumulating material particles, the proportion of the rare earth cold accumulating material particles having the shape factor R being represented by $L^2/4\pi A$ and exceeding 1.5 was 5% or less.

Through these steps, the rare earth cold accumulating material particles according to Examples and Comparative Examples were produced. The average particle size of the rare earth cold accumulating material particles in each of Examples and Comparative Examples was set to be 250 μm.

For the rare earth cold accumulating material particles according to each of Examples and Comparative Examples, the average crystal grain size, the porosity, the average pore size, the maximum pore size and the number of the pores per unit area of 10 μm×10 μm were measured.

The measurements of these values were performed as follows. An enlarged photograph (magnification: 3000) of an arbitrary cross section was taken by SEM. The major axes of the rare earth compound crystal grains shown in the unit area of 10 μm×10 μm were measured. The average value of the major axes of 100 of the rare earth crystal grains was taken as the average crystal grain size.

For the porosity, the maximum pore size and the number of the pores, the area proportion (%) of the pores, the largest pore size and the number of the pores shown in the unit area of 10 µm×10 µm of the enlarged photograph were determined.

This operation was performed in five of arbitrary unit areas (one unit area: 10 µm×10 µm). The average value of the area proportions (%) of the pores in the five unit areas was taken as the porosity (vol. %). The largest pore size in the five unit areas (10 µm×10 µm) was taken as the maximum pore size. The average value of the pore sizes in the five unit areas was taken as the average pore size. The average value of the numbers of the pores in the five unit areas was taken as the number of pores. These measurement results are shown in Table 2 presented below.

TABLE 2

| Sample No. | Average Crystal Grain Size (µm) | Porosity (vol %) | Average Pore Size (µm) | Maximum Pore Size (µm) | Number of Pores per Unit Area (pieces) | Structure of Connected Pores |
|---|---|---|---|---|---|---|
| Example 1 | 2.2 | 20 | 0.8 | 3 | 22 | Observed |
| Example 2 | 2.2 | 28 | 1 | 3.3 | 35 | Observed |
| Example 3 | 2.2 | 39 | 1.1 | 3.5 | 58 | Observed |
| Comparative Example 1 | 2.2 | 2 | 0.7 | 2.5 | 11 | None |
| Comparative Example 2 | 2.2 | 66 | 2.8 | 8.2 | 115 | Observed |
| Example 4 | 2.2 | 20 | 1 | 2.8 | 30 | Observed |
| Example 5 | 2.2 | 29 | 1.8 | 3.4 | 48 | Observed |
| Example 6 | 2.2 | 40 | 1.9 | 3.7 | 59 | Observed |
| Comparative Example 3 | 2.2 | 2 | 0.7 | 2.8 | 9 | None |
| Comparative Example 4 | 2.2 | 56 | 2.7 | 7.9 | 103 | Observed |

In the rare earth cold accumulating material particles according to each of Examples, the respective parameters were within preferable ranges. On the contrary, Comparative Example 1 was low in porosity. Comparative Example 2 was high in porosity.

Next, the refrigerating capacity was measured by using a refrigerator having the rare earth cold accumulating material particles. As the refrigerator, a 4K pulse type refrigerator was adopted. In the refrigerator, a Cu mesh cold accumulating material was filled in the first cooling stage; in the second cooling stage, a group of lead cold accumulating material particles was filled in the first group of cold accumulating material particles, a group of $HoCu_2$ cold accumulating material particles was filled in the second group of cold accumulating material particles, and a group of rare earth cold accumulating material particles was filled in the third group of cold accumulating material particles. In the second cooling stage, Cu meshes as metal meshes were used to partition the filling space.

When a cold accumulating material is filled in the second cooling stage, the cold accumulating material was filled while vibration was applied to the second cooling stage so as for the mutual gaps between the cold accumulating material particles not to be expanded. The Cu meshes of the second cooling stage were pressed into the second cooling stage with a stress of 4 MPa and then fixed. After the filling and fixing operations, the refrigerator was operated, and the refrigerating capacity was checked after elapsed times of 1000 hours, 20000 hours and 30000 hours. The check results thus obtained are shown in Table 3 hereunder.

TABLE 3

| | Refrigerating Capacity (W) | | |
|---|---|---|---|
| Sample No. | After 1000 hours | After 20000 hours | After 30000 hours |
| Example 1 | 1.5 | 1.5 | 1.4 |
| Example 2 | 1.5 | 1.5 | 1.4 |
| Example 3 | 1.5 | 1.5 | 1.4 |
| Comparative Example 1 | 1.3 | 1.3 | 1.3 |
| Comparative Example 2 | 1.2 | 1.1 | 0.8 |
| Example 4 | 1.5 | 1.5 | 1.4 |
| Example 5 | 1.5 | 1.5 | 1.4 |
| Example 6 | 1.5 | 1.5 | 1.4 |
| Comparative Example 3 | 1.3 | 1.3 | 1.3 |

TABLE 3-continued

| | Refrigerating Capacity (W) | | |
|---|---|---|---|
| Sample No. | After 1000 hours | After 20000 hours | After 30000 hours |
| Comparative Example 4 | 1.1 | 1 | 0.8 |

As can be seen from the results shown in Table 3, the refrigerators according to present Examples are effectively suppressed in the degradation of the refrigerating capacity. The rare earth cold accumulating material particles were taken out from each of the refrigerators after the 30000-hour operation, the change of the particle shapes was examined, and the groups of the rare earth cold accumulating material particles according to Examples were found to be free from destroyed particles.

On the other hand, as shown in Comparative Examples 2 and 4, the rare earth cold accumulating material particles having a porosity exceeding 50 vol. % were low in strength, and were verified to have destroyed particles. In addition, as shown in Comparative Examples 1 and 3, the cold accumulating material particles having a low porosity did not allow the He gas to enter the interior of the particles, and accordingly degraded the refrigerating capacity.

Thus, the refrigerators according to Examples were revealed to be drastically improved in the long-term reliability. Accordingly, long-term reliabilities of various devices such as superconducting magnets, inspection devices and cryopumps mounting such refrigerators can be drastically improved.

In the preceding description, several embodiments of the present invention are presented; however, these embodiments are presented as examples, but have no intention to limit the scope of the invention. These novel embodiments can be implemented in various forms, and within a range not deviating from the gist of the invention, various omissions, replacements and alterations can be performed. These embodiments and the modified examples thereof are included in the scope or the gist of the present invention, and at the same time, included in the invention described in the scope of the claims and the equivalent scope thereof. The foregoing embodiments can be implemented as mutually combined.

REFERENCE SIGNS LIST 1 rare earth cold accumulating material particle
2 rare earth compound (rare earth oxide or rare earth oxysulfide) crystal grain
3 pore
4 structure of connected pores
5 cold accumulating vessel
6 metal mesh
1-1 first group of cold accumulating material particles
1-2 second group of cold accumulating material particles
1-3 third group of cold accumulating material particles

The invention claimed is:

1. A method of manufacturing a refrigerator for accumulating an ultralow temperature of 20 K or lower, the method comprising the steps of:
providing a cold accumulating vessel; and
packing a rare earth cold accumulating material particle in the cold accumulating vessel;
wherein the rare earth cold accumulating material particle consists essentially of a rare earth oxide or a rare earth oxysulfide;
wherein the rare earth cold accumulating material particle is a sintered body;
wherein an average crystal grain size of the sintered body is 0.5 to 5 μm;
wherein a porosity of the sintered body is 10 to 50 vol %;
wherein an average pore size of the sintered body is 0.3 to 3 μm; and
wherein in an arbitrary cross section of the rare earth cold accumulating material particle, a number of pores per a unit area of 10 μm×10 μm is 20 to 70.

2. The method according to claim 1, wherein a group of the rare earth cold accumulating material particles packed in the cold accumulating vessel includes the rare earth cold accumulating material particles in a content of 50% by mass or more and 100% by mass or less.

3. The method according to claim 1, wherein the refrigerator is a GM refrigerator.

4. The method according to claim 1, wherein the refrigerator is a Stirling refrigerator.

5. The method according to claim 1, wherein the refrigerator is a pulse tube refrigerator.

6. The method according to claim 1, wherein two or more stages of cold accumulating material-filled zones are formed which are divided by a metal mesh material in at least one cold accumulating vessel, and the rare earth cold accumulating material particles are packed in at least one stage of regenerator material-filled zones.

7. The according to claim 6, wherein the metal mesh material comprises a metal mesh member composed of copper or a copper alloy is packed.

8. The method according to claim 7, wherein the method further comprises the step of packing the mesh material comprising a metal mesh member composed of copper or a copper alloy.

9. The method according to claim 1, wherein the refrigerator is used for obtaining an ultralow temperature of 10 K or lower.

10. The method according to claim 1, wherein the rare earth cold accumulating particle has an average particle size of 100 to 500 μm.

11. The method according to claim 1, wherein a filling factor of the cold accumulating material particles in the cooling stage of a refrigerator falls within a range from 55 to 70%.

12. The method according to claim 1, wherein the rare earth cold accumulating material particle has an aspect ratio of 2 or less.

13. The method according to claim 1, wherein when L represents a perimeter length of a projection image of each of the cold accumulating material particles constituting a group of rare earth cold accumulating material particles, and A represents the actual area of the projection image, in the group of rare earth cold accumulating material particles, a proportion of the rare earth cold accumulating material particles having a shape factor R being represented by $L^2/4\pi A$ and exceeding 1.5 is 5% or less.

14. The method according to claim 1, wherein the rare earth cold accumulating material particle comprises gadolinium aluminum oxide ($GdAlO_3$) or gadolinium oxysulfide ($Gd_2O_2S$).

15. A method of manufacturing a pulse tube refrigerator for accumulating an ultralow temperature of 20 K or lower, the method comprising the steps of:
filling a Cu mesh cold accumulating material in a first cooling stage;
partitioning a filling space of a second cooling stage into a first to a third filling spaces;
filling a group of lead cold accumulating material particles into the partitioned first filling space;
filling a group of $HoCu_2$ cold accumulating material particles into the partitioned second filling space; and
filling a group of cold accumulating material particles into the partitioned third filling space wherein the rare earth cold accumulating material particle consists essentially of a rare earth oxide or a rare earth oxysulfide;
wherein the rare earth cold accumulating material particle is a sintered body;
wherein an average crystal grain size of the sintered body is 0.5 to 5 μm;
wherein a porosity of the sintered body is 10 to 50 vol %;
wherein an average pore size of the sintered body is 0.3 to 3 μm; and
wherein in an arbitrary cross section of the rare earth cold accumulating material particle, a number of pores per a unit area of 10 μm×10 μm is 20 to 70.

16. The method according to claim 15, wherein the pulse tube refrigerator is a 4K pulse tube refrigerator.

17. A method of manufacturing a superconducting magnet provided with a refrigerator for accumulating an ultralow temperature of 20 K or lower, wherein the refrigerator is manufactured by the method according to claim 1.

18. A method of manufacturing an MRI provided with a refrigerator for accumulating an ultralow temperature of 20 K or lower, wherein the refrigerator is manufactured the method according to claim 1.

19. A method of manufacturing an NMR provided with a refrigerator for accumulating an ultralow temperature of 20

K or lower, wherein the refrigerator is manufactured by the method according to claim 1.

20. A method of manufacturing a cryopump provided with a refrigerator for accumulating an ultralow temperature of 20 K or lower, wherein the refrigerator is manufactured through the method according to claim 1.

* * * * *